(12) United States Patent
Burrell et al.

(10) Patent No.: US 8,165,952 B2
(45) Date of Patent: Apr. 24, 2012

(54) ELECTRONIC TRADING SYSTEM

(75) Inventors: C. Austin Burrell, Scottsdale, AZ (US); Nigel Bandy, London (GB); Terry Ramsden, New York, NY (US)

(73) Assignee: Private Trading Systems, Inc., Scottsdale, AZ (US)

( * ) Notice: Subject to any disclaimer, the term of this patent is extended or adjusted under 35 U.S.C. 154(b) by 984 days.

(21) Appl. No.: 11/515,279

(22) Filed: Aug. 31, 2006
(Under 37 CFR 1.47)

(65) Prior Publication Data
US 2007/0226122 A1 Sep. 27, 2007

Related U.S. Application Data

(60) Provisional application No. 60/732,743, filed on Nov. 2, 2005.

(51) Int. Cl.
*G06Q 40/00* (2012.01)

(52) U.S. Cl. ........... 705/37; 382/209; 705/36 R; 705/38; 705/76; 705/80; 713/176

(58) Field of Classification Search ........... 705/76, 705/80, 35–45; 713/176; 302/209
See application file for complete search history.

(56) References Cited

U.S. PATENT DOCUMENTS

| | | | | | |
|---|---|---|---|---|---|
| 5,262,942 | A | * | 11/1993 | Earle | 705/37 |
| 5,500,793 | A | * | 3/1996 | Deming et al. | 705/37 |
| 6,173,270 | B1 | * | 1/2001 | Cristofich et al. | 705/37 |
| 7,117,176 | B2 | * | 10/2006 | Wallman | 705/36 R |
| 7,152,047 | B1 | * | 12/2006 | Nagel | 705/76 |
| 7,158,956 | B1 | * | 1/2007 | Himmelstein | 705/80 |
| 7,165,045 | B1 | * | 1/2007 | Kim-E | 705/37 |
| 7,167,844 | B1 | * | 1/2007 | Leong et al. | 705/80 |
| 2002/0007335 | A1 | * | 1/2002 | Millard et al. | 705/37 |
| 2002/0073015 | A1 | * | 6/2002 | Chan et al. | 705/37 |
| 2002/0156719 | A1 | * | 10/2002 | Finebaum et al. | 705/37 |
| 2002/0161690 | A1 | | 10/2002 | McCarthy et al. | |
| 2003/0055787 | A1 | * | 3/2003 | Fujii | 705/44 |
| 2004/0039689 | A1 | * | 2/2004 | Penney et al. | 705/38 |
| 2004/0083159 | A1 | * | 4/2004 | Crosby et al. | 705/37 |
| 2004/0107154 | A1 | * | 6/2004 | Nishimaki | 705/36 |
| 2004/0236668 | A1 | * | 11/2004 | Toffey | 705/37 |
| 2005/0192888 | A1 | * | 9/2005 | Lennane et al. | 705/37 |
| 2005/0222941 | A1 | * | 10/2005 | Tull, Jr. | 705/37 |
| 2005/0262350 | A1 | * | 11/2005 | Boutant et al. | 713/176 |
| 2006/0059077 | A1 | * | 3/2006 | Goodman et al. | 705/37 |
| 2006/0173768 | A1 | * | 8/2006 | Zubairi | 705/37 |
| 2008/0267511 | A1 | * | 10/2008 | Bourrieres et al. | 382/209 |

FOREIGN PATENT DOCUMENTS

JP 406224896 A * 8/1994

OTHER PUBLICATIONS

Rivest, et al. A Method for Obtaining Digital Signatures and Public-key Cryptosystems., Communications of ACM 21(2):120-126 (Feb. 1978).*

* cited by examiner

*Primary Examiner* — Robert Niquette
(74) *Attorney, Agent, or Firm* — Timothy J. Bechen

(57) ABSTRACT

An electronic trading system facilitates electronic trades of fungible trading elements. Fungible trading elements are electronically displayed and the system facilitates the trading operations. A risk factor for a particular transaction may be determined and based on this risk factor, the electronic trading system may elect straight through processing (STP) operations to conclude a trade. Otherwise the risk factor may indicate avoiding the STP and allowing other settlement means. The electronic trading system also include the dematerialization of the trading elements, therefore verifying ownership prior to exchange and as such as more robust and secure trading platform.

26 Claims, 4 Drawing Sheets

ELECTRONIC TRADING SYSTEM

CROSS-REFERENCE TO RELATED APPLICATIONS

This application claims priority to U.S. Provisional Patent Application Ser. No. 60/732,743, filed on Nov. 2, 2005, which is expressly incorporated herein in its entirety by reference hereto.

BACKGROUND OF THE INVENTION

The present invention relates generally to an electronic trading system and more specifically to facilitating the trading of instruments, investments, securities and assets between buyers and sellers in a trading environment.

There are currently many different trading systems providing different approaches for trading different types of instruments, investments, securities and assets. A common trading system is an open outcry system where traders representing buyers and sellers openly cry out buy and seller orders. This trading system, while having a long historic legacy, is limited by the physical requirement of the parties needing to be within the same location, commonly known as a trading floor. This trading technique is also time consuming because after open outcry orders are fulfilled, there is a long process before settling the accounts between buyer and seller.

Another trading approach is an exchange referred to as a market maker. The exchange provides a platform for traders to exchange various Instruments, investments, securities and assets. Historically, exchanges included traders meeting a central location, similar to an open outcry exchange. These exchanges typically require any investor to trade instruments through a broker or other person authorized to perform activities within the confines of the trading platform.

With the advent of computing systems, the landscape of trading has shifted. While many systems still utilize traders, there is a growth in exchange options using electronic means. For example, through a network connection, such as across the Internet, a user may physically log in to an exchange service and manually submit buy and sell orders with the exchange. From the user's personal account, various instruments, typically stocks or bonds, can be bought or sold with the simple click of a button. In these systems though, the exchange itself underwrites the transaction so the user may purchase instruments from the exchange and similarly sells instruments to the exchange.

In the current electronic systems, there are numerous entities and systems that must operate together to complete these trade transactions. With these different entities and systems, there is also a significant time delay before any single transaction is completed. For example, even though a person may complete a trade on day 1, the item purchased may not be delivered for any number of days thereafter.

Using the example of an electronic trading system, if a user wants to purchase an exchange instrument, the user would submit a buy order. This buy order is submitted through a computing interface, such as across a network connection. The service that the user subscribes to acts as an agent to present the buy order to a particular market. Similarly for sell orders, within the market, a sale is made through matching buy and sell orders, and with a match the first portion of this transaction is complete.

For these existing trading systems, this represents a small portion of the time and effort until the full transaction is complete. On the back end of this process is a complicated and extensive process including a number steps that may involve additional parties. The finality of the buy and sell transaction must be settled. This settlement includes different entities and/or transactions to settle the trade.

One step is verifying that the seller owns that being sold. Another step is the delivery of funds from the buyer to the seller. This may be processed by one or more banking institutions and may include active linking to outside bank accounts or the use of internal accounts. Upon receipt of the money, ownership of the item purchased must then be delivered to the buyer. In the case of physical items, e.g. stock certificates, they must be physically delivered, where physical papers evidence ownership of an asset or investment. Otherwise, the ownership rights may be electronically adjusted in another monitoring system. Regardless of the delivery technique, there is a delay because different systems must interact to provide verification of the original ownership, settlement of payment and then delivery.

Problems can arise in these transactions for any number of reasons. Problems can occur when a buyer does not have the funds to pay for the purchase. Problems can occur when a seller fails to have ownership of the item being sold. With all the different unrelated entities involved, there is also a significant delay between when a buyer buys an item and has ownership rights to thereupon sell the item.

It is a goal to have a trading system with straight through processing (STP). STP would provide for a seamless and veritable instantaneous completion of a transaction. In the existing systems, STP is not attainable. Moreover, there are numerous resulting and burdensome interactions and Interactions amongst and between the entities that have steps to perform to facilitate a transaction, and there are resulting burdensome costs because each party also takes a percentage of each transaction as a fee. So current trading systems, even the ones using electronic trading techniques, are not only unable to perform STP, they inherently include a greater of amount of cost overhead than a system having a single entity performing all of the backed operations.

DETAILED DESCRIPTION OF THE INVENTION

A trading system provides an improved platform for the electronic trading of a fungible element. In view of the teaching of this specification, the below-described system may be used for trading instruments, investments, securities and/or assets. Scalable, the trading system may provide for varying levels of interaction across different jurisdictions. Through interfacing directly with a user acting as either a buyer or a seller, the trading system provides a direct order book based system for the open exchange of the tradable securities.

Any fungible asset may be tradable on the trading system using a standardization and dematerialization technique for making the asset available. Through the interface and electronic exchange system, users may make buy or sell requests in real time. With back-end system support through interfacing with one or more custodial entities, an exchange between a buyer and seller may be performed in a straight through processing (STP) fashion. Similarly, STP may be avoided by the system in risky situations and a non-STP process used to provide a greater degree of security for various parties to one or more transactions.

In one embodiment, an algorithm or other routine may determine if STP should be used or if human intervention is warranted. Various factors relating to the transaction can be defined, for example the amount and value of equities and/or funds involved, the experience level of the parties, the identity and characteristics of the custodians, the frequency of like transactions by the parties or other factors. From these factors, a corresponding risk level can be determined. If the risk is above a certain level, the back office can specifically prohibit STP by requiring human intervention and the manual inspect of one or more steps in the closing of the transaction. Similarly, if the risk factors are below the predefined level, the system may close the transaction with STP.

The trading system may also provide further enhancements to the user beyond facilitating a trade. An electronic display of tradable instruments provides an open display of items available for purchase or sale, as well as corresponding prices. The trading system illustrates the items available for purchase and requested prices, therefore a buyer approaching the trading system accesses the outstanding offers currently made available by the seller. Similarly, the trading system may provide varying accounting benefits for tradable instruments having returns or dividends payable, such as automatically offsetting any purchase price by pro-rated returns. The trading system may also provide market information to users based on preferences for markets or types of instruments.

As described below, the trading system, through the utilization of a single processing environment having the ability to perform STP provides users looking to buy and sell tradable elements across a single platform with a secure, timely and cost-effective transaction.

Figure 1:
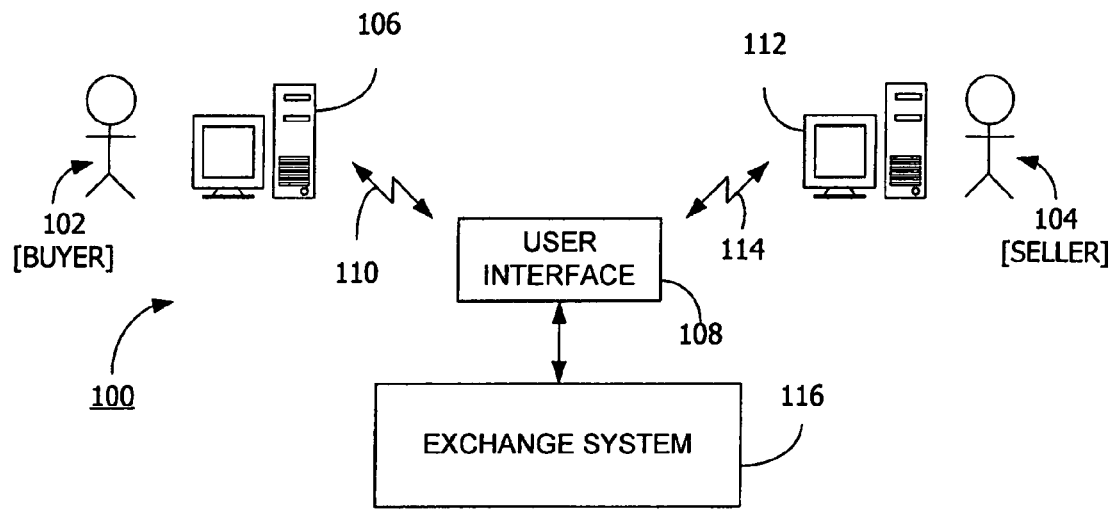
FIG. 1 illustrates a block diagram of the environment for the usage of an electronic trading system.

FIG. 1 illustrates a trading environment 100 having a buyer 102 and a seller 104. The buyer 102 utilizes a computer 106 to access a user interface 108, typically across an internet connection, shown generally at 110. Similarly, the seller 104 utilizes a computer 112 to access the user interface 108, also typically using an internet connection 114.

The user interface 108 may be a software module running on a server or other operating platform. Similarly, the user interface 108 may be a combination of hardware and/or software components providing functionality as described below. In one embodiment, the user interface 108 is accessible across a network connection, such as an internet connection using known interface protocols between the computers 106, 112 and the interface 108. The interface 108 may also use known security techniques or protocols to provide secure connections therebetween. For example, the user interface 108 may provide public/private key encryption to generate a secure connection. In another embodiment, the buyer 102 and seller 104 may have existing accounts and they provide a password or other validation for establishing the secure connection.

The user interface 108 is in communication with an exchange system 116. The system 116, as described in further detail below, may include one or more processing systems allowing for the receipt of input commands through the user interface 108 and performing corresponding functions. The system 116 may include various levels of entities providing for the execution of a trade or in another embodiment may facilitate further communication with other entities that can complete requested transactions.

Using known data transfer protocols, the user interface 108 may communicate information between the buyer 102 and the exchange system 116 and the seller 104 and the exchange system 116. When certain transactions are performed, the exchange system 116 also updates a display allowing for any user or authorized user, such as anyone logged into the interface 108, to see the information. For example, if the seller 104 places an offer to sell a preset number of units of a particular item, this sell offer is then posted to a board listing items available for purchase. Similarly, if the buyer 102 places an order to purchase a number of available items, once the purchase has been accepted, the exchange system 116 provides a display indicating the items are no longer available for purchase.

Therefore, various operations relating to the trading of one or more Instruments, investments, securities and assets may be performed within the exchange system 116, as described below. Users may monitor the exchange system 116 and perform various functions in the exchange system 116 through the user interface 108. As recognized by one having ordinary skill in the art, the user is provided a visual display on the user's computer (e.g. 106 or 112), where the display is the product of information received from the user interface 108. The display on the computer may also be facilitated by operating instructions and information also resident on the computer itself, for example some data may be locally stored on the computer itself later combined with data from the exchange system 116 or the user interface 108.

Figure 2:
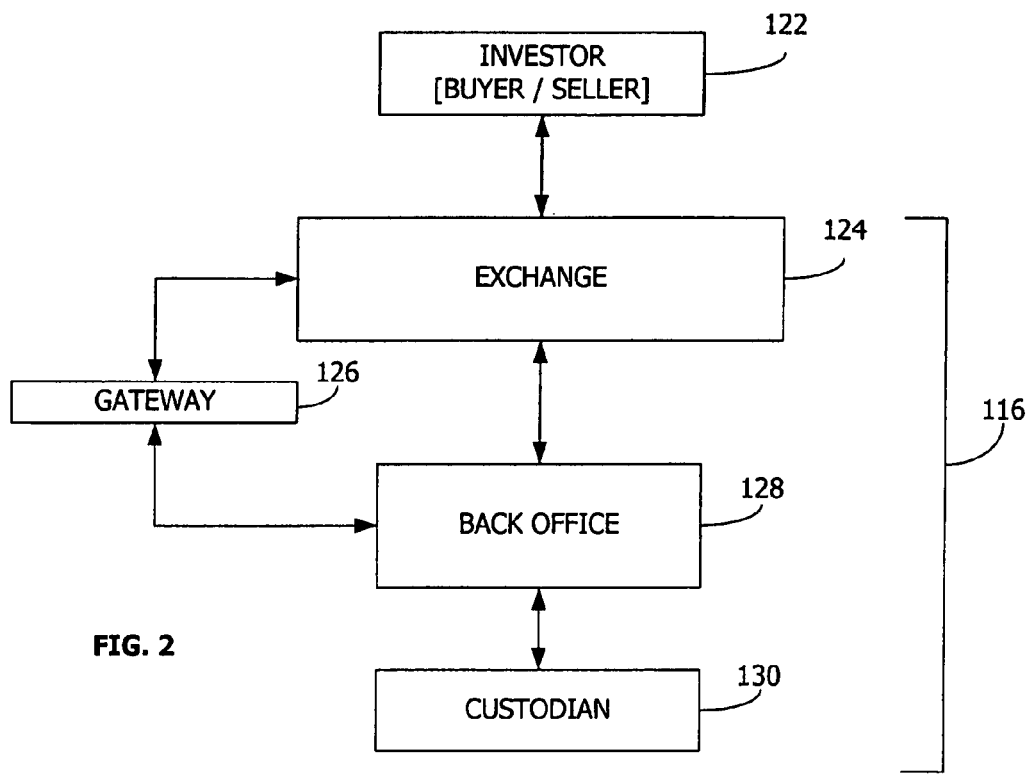
FIG. 2 illustrates a block diagram of one embodiment of an electronic trading system.

FIG. 2 illustrates one embodiment of an electronic trading system. The system includes an investor interface 122, an exchange processing device 124, a gateway 126, a back office 128 and a custodian 130.

The investor interface 122 may be a computing interface, similar to the user interface 108 as described with respect to FIG. 1, where an investor, such as the buyer 102 or the seller 104 may access the exchange processing device 124. The exchange processing device 124 may be one or more processing devices executing software applications providing for the functionality of an investor to utilize the exchange system as well as monitor the current status of the market of instruments, investments, securities and assets being traded thereon.

The gateway 126 may be one or more processing devices facilitating communication with a back office 128 or, if and to the extent that the investor interface may communicate directly with all portions or some of the back office 128, there may be a direct communication between them as is shown. The back office 128, which may include the custodian 130, provides an electronic settlement of trades and other transactions performed by the exchange processing device 124. In one embodiment, the back office operates on the SunGuard APSYS software application. Similarly, the custodian 130, which may also be a separate entity, is typically an entity or institution that maintains control of one or more assets for investors. Within the custodian 130 are one or more computing systems that provide not only electronic storage of assets used in the exchange, but can also provide verification of ownership of these assets.

Figure 3:
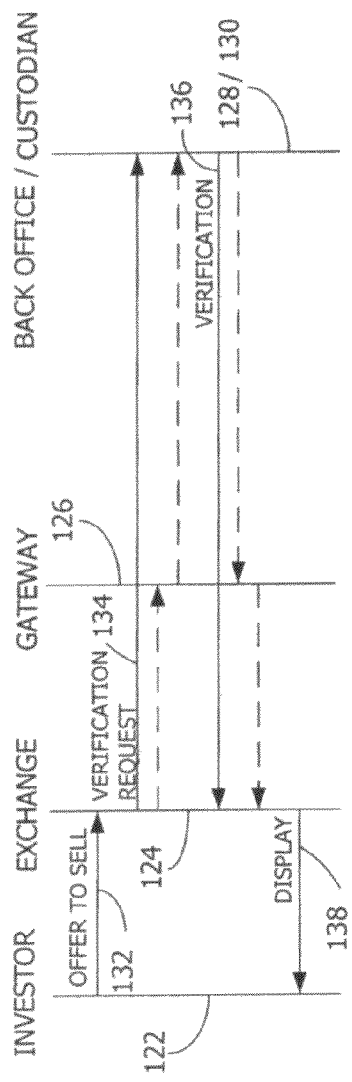
FIG. 3 illustrates a data flow diagram of one embodiment of the system of FIG. 2.

FIG. 3 illustrates a data flow diagram of one embodiment of the system of FIG. 2. An investor, through the interface 122 provides an offer to sell 132 to the exchange processing device 124. Also illustrated in the data flow diagram of FIG. 3, the back office 128 and custodian 130 are a single entity, but as illustrated in FIG. 2, there are embodiments where the back office 128 and the custodian 130 are separate entities. Not illustrated, the processing device 124 may include various levels of authentication to verify the identity of the investor.

When the offer to sell 132 is electronically received, the exchange processing device 124 secures verification of the seller's ownership rights prior to allowing the offer to be publicly known. The data flow diagram of FIG. 3 illustrates two different embodiments. In one embodiment, a verification request 134 is submitted by the exchange processing device 124 to the back office 128/custodian 130. This first embodiment includes a dedicated or trusted connection between the device 124 and the back office 128/custodian 130. For example, if a virtual private network can be and is utilized and an appropriate SWIFT command is given, the device 124 may directly communication with the back office 128/custodian 130. In the second embodiment, where the back office 128/custodian 130 may not have a direct relationship with the device 124, including direct connectivity or interactivity, the gateway 126 may be used. The gateway 126 may convert the verification command received from the exchange 124 into an appropriate SWIFT command to the back office 128/custodian 130, allowing for the custodian 130 to recognize the command through its existing banking communication system.

Not specifically illustrated, the seller may first have to dematerialize the equity wishing to be exchanged. This step may be done using any known techniques, such as using a custody or settlement system. For example, a private company share may be dematerialized using a service from Cedel, Euroclear, DTC, Sega or any other entity. Then, using a Swift interface, the ownership of this equity may be verified.

Also not specifically illustrated in the data flow of FIG. 3, the back office 128 may be used to facilitate communication with the custodian 130. It is also understood that the custodian 130 may be located adjacent to and/or integrated with the back office 128; a banking institution may not only have custody of the instrument, investment, security and/or asset, but also perform the back office functions. It is envisioned that the custodian 130 and the back office 128 may be separate units, therefore the back office 128 may communicate with the custodian 130 using the APSYS interface. In this embodiment, neither the back office nor the custodian utilize communication interfaces beyond the existing commonly used interfaces. It is recognized that there are any number of suitable interfaces that may be used, as recognized by one having ordinary skill in the art.

The back office 128/custodian 130 may validate possession and proper ownership of the equity. A validation command 136 may then be sent to the exchange processing device 124. The validation 136 may also be sent to the gateway 126 and then to the device 124, or it may be sent to the back office 128 in an embodiment where the back office 128 is separate from the custodian 130 prior to being sent to the gateway 126 or the device 124.

Figure 4:
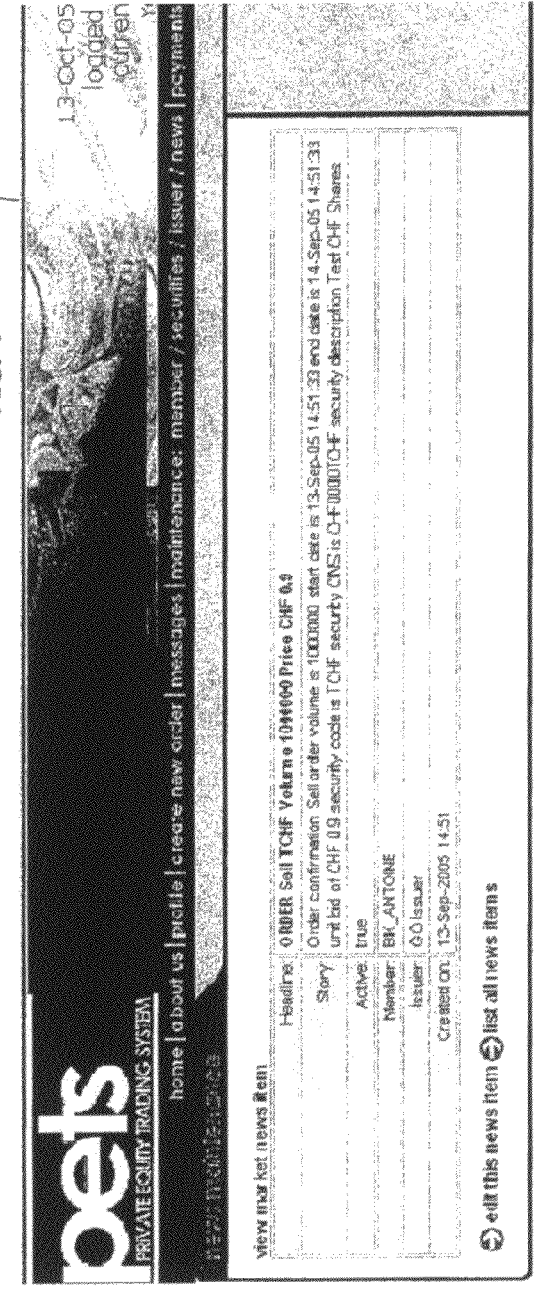
FIG. 4 illustrates a screenshot of one embodiment of a sell order within the system of FIG. 2.

Within the system, it is the validation of the offer to sell which allows the display of equities within the trading system. The exchange processing device 124 provides a display signal 138 to the investor interface 122. This display signal 138 allows for a visual confirmation of the offer for sale within the system. As an example, FIG. 4 illustrates a screenshot 140 of a confirmation of sell order.

This display signal 138 also provides a public display of the offer so that buyers may accordingly know that an asset is available for trade. It is also recognized that just as an investor may place an offer for sale on the exchange system, an investor may make an offer to buy. The offer to buy may not necessarily be in direct response to a listed asset being offered on the exchange, but can be an indication that a buyer is seeking a seller for a particular equity at a particular price level.

Figure 5:
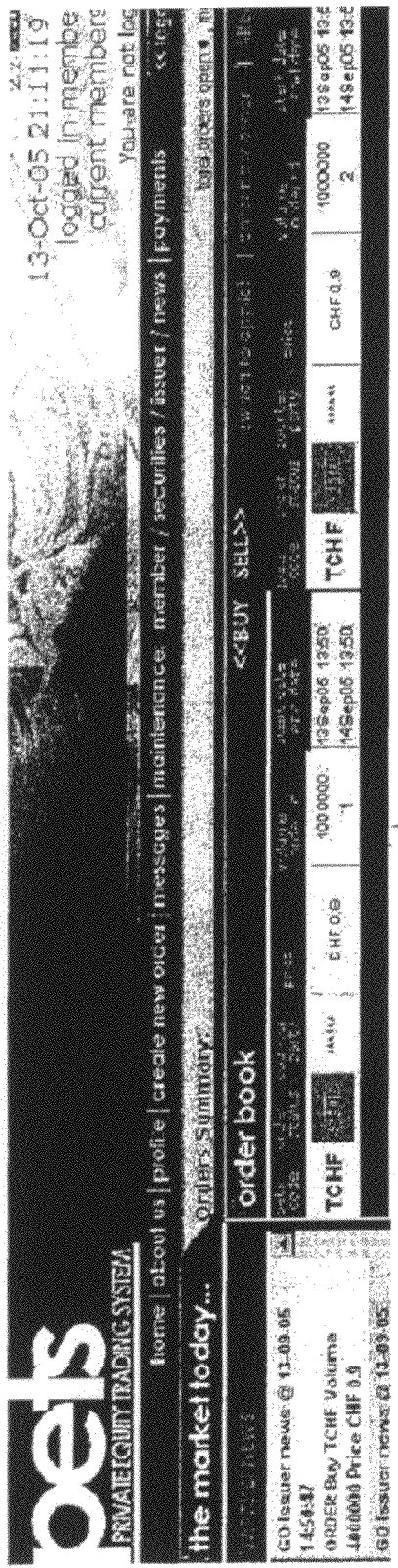
FIG. 5 illustrates a screenshot of one embodiment of a display of outstanding offers on the exchange system.

FIG. 5 illustrates a screenshot 150 listing the order books of offers outstanding on the exchange. While the screenshot 150 lists a single offer for purchase and a single offer for sale, the system may hold any number of offers. These offers may be categorized by the types of instruments being sold, they may be categorized by length of post, they may be categorized by an investor's internal preference or any other suitable technique. As illustrated in the screenshot 150 of FIG. 5, investors on the exchange may view equities or offers currently available.

Figure 6:
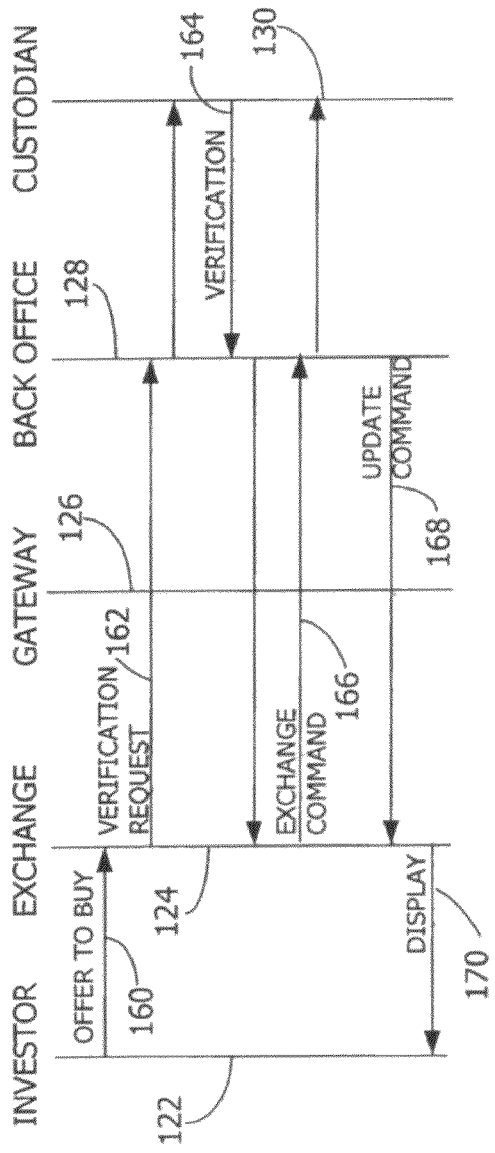
FIG. 6 illustrates a data flow diagram of one embodiment of the system of FIG. 2.

FIG. 6 illustrates a data flow of one embodiment of an investor submitting an offer to buy 160 an instrument listed on the exchange. Using the investor interface 122, typically across a secured internet or other networked connection, an investor can submit the offer 160. The exchange processing device 124, performing processing steps in response to executable instructions, matches the offer to buy with a corresponding verified offer to sell. The match does not necessarily need to be identical, but can be a partial match. For example, if a seller is selling 10,000 share of an equity and a buyer offers to buy 7500 shares, the exchange 124 may complete the transaction as to 7500 of the shares, leaving 2500 shares still available for purchase by another investor. It is recognized that in one embodiment, the seller may indicate a wish to exclude this feature if desired.

When a match is found, the exchange processing device 124 generates a verification command 162 to verify that the buyer has the corresponding assets, typically financial reserves, to cover the transaction. The verification command 162 is provided to the back office 128, where the back office 128 may use an APSYS interface to seek verification of funds within a corresponding account controlled by the custodian 130. The back office 128 uses existing interface commands so as to not require the custodian 130 to employ additional software solely for the purpose of communicating with the back office 128. Similarly, as discussed above for sellers, in another embodiment, the gateway 126 may also be used to communicate between the exchange 124 and the back office 128, if needed.

It is recognized that the verification command 162 may also include a re-verification as to the ownership of the instruments, investments, securities and/or assets the investor is seeking to purchase. This re-verification may be done similar to the data flow of FIG. 3 and can provide authentication that the seller is authorized to sell the relevant instruments, investments, securities and/or assets at a time almost immediately prior to the execution of the trade.

There may be various embodiments for providing verification of the ownership of elements to the exchange prior to completing the exchange. In one embodiment, the transaction may be processed immediately upon complete verification for both parties, although this may include the risk of a change in status in one of the parties' accounts in the time between verification and processing the exchange. In another embodiment, when a re-verification is performed, there may be a time limit imposed that if both verifications (buyer ownership verification and seller ownership verification) have occurred at a time longer than the time limit, they must be re-verified again. In another embodiment, a hold may be placed or ordered on the element to the exchange until the transaction is completed. For example, if the seller's financial accounts are verified to confirm dollar amounts in the account, a hold may be placed on the corresponding dollar amount, similar to the technique used with a credit card company when a customer checks into a hotel room. In another embodiment, when verification is performed, the ownership rights to the elements may be withdrawn and held in a temporary account until the transaction is completed. Should the transaction fail, the elements may then be immediately returned to the account.

If the custodian 130 verifies the buyer has the funds to support the transaction, a verification command 164 may be generated using the known data protocols, such as for example APSYS using an IS 15022 protocol. This command 164 is received by the back office 128 and is provided to the exchange processing device 124. The device 124 then has assurance from a custodian 130 that both parties are capable of completing the transaction, the seller owns the equities and the buyer has the funds to trade for the equity as of the time of the verification.

In one embodiment, the exchange can then be performed. Within the device 124, the exchange may be a command to indicate that all conditions have been satisfied and the exchange may be processed. An exchange command 166 is then provided to the back office 128. The back office 128 processes the exchange and coordinates with the custodian(s) 130 to complete the transfer. For example, the back office 128 instructs a funds transfer from the buyer's account to the seller's account and instructs the transfer of ownership rights in the equity from seller to buyer.

As part of the STP, the back office 128 provides a direct communication link with the custodian(s) 130 using existing communication networks and existing communication protocols. The veracity of the parties' ability to engage in the transaction may be verified immediately prior to consummating the transaction, therefore the back office 128 operations include finalizing the details of exchanging funds and ownership. In the event the exchange processing device 124 and the back office 128 have verification of the exchange, the transfer of ownership and funds may be performed without delay. It is recognized though that different embodiments exist based on the risk associated with the different parties and different entities. In standard common transactions with known parties, STP may be provided due to a large reduction in risk associated with the transaction. And similarly, transactions involving unknown parties, high volume or value amounts or other non-conforming features may be denied STP to allow for human intervention in the back office 128. A risk factor may be determined by addressing the various factors to the transaction and this risk factor may be used for a threshold determination of whether STP settlement is proper or should be denied, thus using non-STP settlement techniques.

Within the exchange itself, the order book system also needs to be updated to reflect the current status of the market. As discussed above, the trading system may be an order book system providing a full disclosure of the elements available for trade on the system. Consistent with full disclosure is the timeliness of the information. Therefore, when the transaction has been completed and the back office 128 can submit an update command 168 to the processing device 124. The device 124 thereupon generates an update display command 170 to update the listing of equities available for purchase or trade.

As described above, the private equity trading system allows for investors to meet and collectively engage in the trading of fungible instruments, investments, securities and assets. In one embodiment, identification numbers are assigned to the equities, such as a CUSIP or an ISIN identifier. Within the trading system, investors are provided a central location to meet, provided a common interface for the announcement of equities within the market and a software interface for facilitating the trade. In combination with the front end software interface, the trading system provides integrated back end support to allow for the seamless facilitation of trades between investors.

Figure 7:
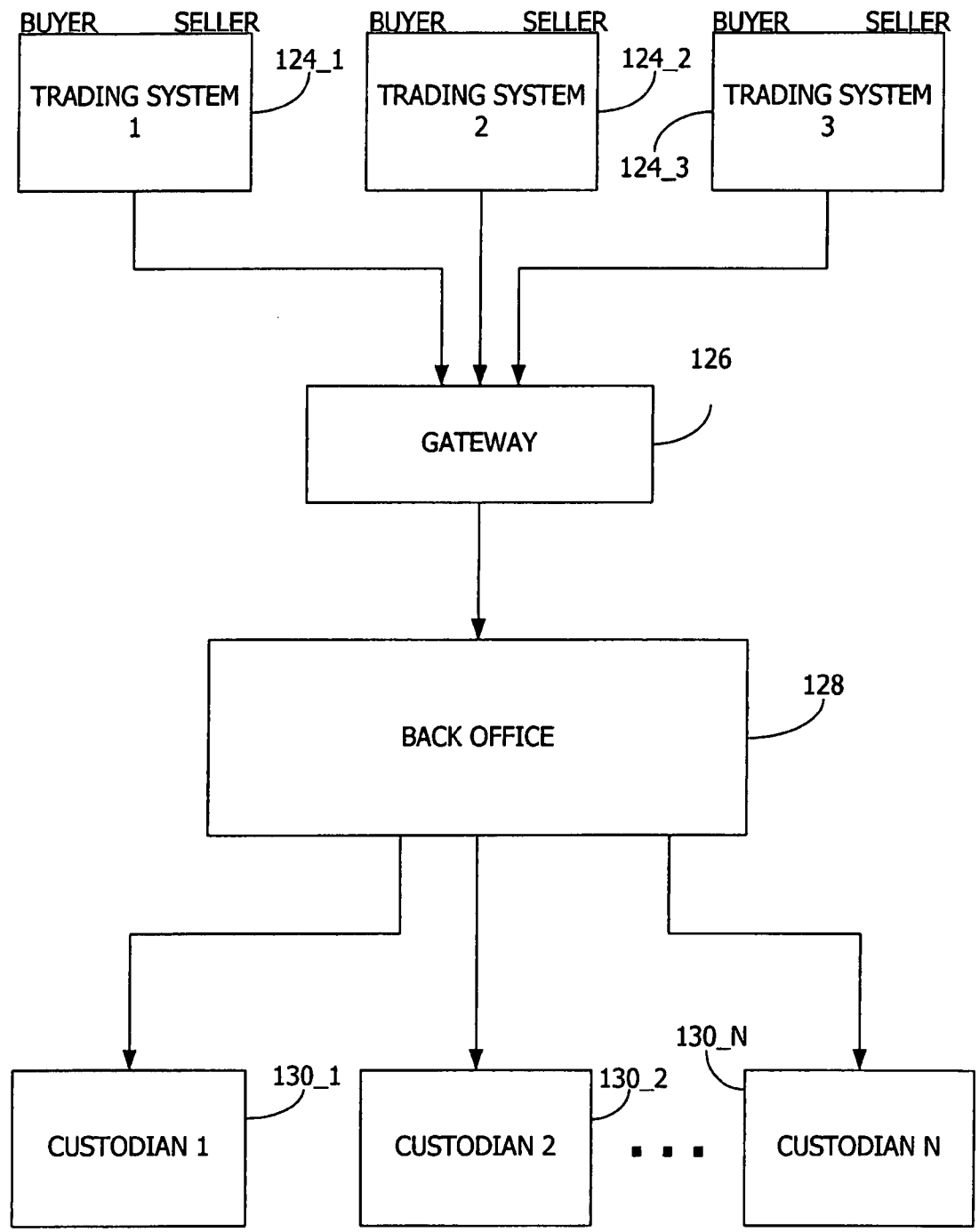
FIG. 7 illustrates a block diagram of one embodiment a system having multiple trading systems.

FIG. 7 illustrates one embodiment of a system using multiple trading systems 124. This embodiment is illustrated with three different systems, 124_1, 124_2 and 124_3, collectively referred to as 124. It is envisioned that numerous systems 124 may be employed. These systems 124 may be dedicate to specific instruments, investments, securities and assets or may be distinguished based on other criteria, for example physical location or access within different jurisdictions have varying guidelines.

Similar to the embodiments described above, the trading systems 124 provide for facilitating trading between buyers and sellers. Through standard protocol interfaces, buyers and sellers can place buy and sell orders on the system. As these requests are provided in the front end of the processing system, the back end of the system seamlessly performs the administrative functions to complete the transaction.

In the embodiment of FIG. 7, the front end systems 124 may all utilize a common back end network including the gateway 126. As described above, the gateway may use standard encoding techniques, such as ISO 15022 or other standards, to provide communication with the back office 128. The back office 128 may use commercially available software to perform the back office operations of completing the buy or sell request including generating instructions for custodians 130.

FIG. 7 illustrates a first custodian 130_1, a second custodian 130_2 and an n-number custodian 130_n, where n represents any integer value. The custodians (collectively referred to as 130) may provide services for different instruments, investments, securities and assets or funds. For example, one custodian 130 may provide for dematerialized instruments, investments, securities and/or assets such that the back office 128 can verify ownership or instruct the change in ownership after the completion of a trade. The custodian 130 may be a financial institution controlling the funds for a buyer or an account for a seller. Prior to a trade, the back office 128 may verify a buyer's ability to perform the trade and after a trade, the back office may instruct transferring funds between custodians 130** as per the terms of the trade.

In the embodiment of FIG. 7, multiple front end systems may be used with a single back end system of a gateway 126 and a back office 128. This allows a greater degree of flexibility in the establishment of the full trading system between the location or accessibility of the trading system(s) 124 and the back end system. It is also noted that there may also be a plurality of back offices performing relating functions as described above.

In one embodiment, the trading system 124 may include a time embargo for the display of available information. In the principle that all market information should be timely for fairness, updating and reporting functionalities within the exchange system (as visible by the users through the interface) may be delayed to insure that all parties receive the same information at the same time. Therefore, updating information may be delayed by a defined time to insure accurate and proper information for all parties using the system.

It is also noted that the exchange 124 may include any number of different features available by one or more software applications executed within the processing system. The exchange 124 may include one or more databases storing the instrument, investment, security and/or asset information as well as the offer information that is subsequently displayed through the processing system. Included in the available features may be currency conversion. As the exchange 124 may be accessible by users from different countries and custodians 130 may be in varying jurisdictions with different currency, the exchange may similarly perform currency conversion as needed. The conversion may include the most current conversion rates and similarly adjust financial amounts accordingly.

Another available feature within the exchange 124 may be the dissemination of information to users. In establishing an account, a user may set preferences or other guidelines that indicate the user's area of interest. The exchange 124 may monitor transactions relating to those areas of interest. For example, if the user has a preference for security interests in insurance companies, if an equity becomes available on the exchange or corresponding equities are traded, the user may be notified. Based on the time sensitive nature of the information, the user may be notified using external communication techniques, such as being sent an electronic message or paged. Alternatively, the exchange can queue up internal messages that the user retrieves when accessing the network.

In addition to trading information, the exchange may also monitor market information relative to user preferences. For example, the exchange may monitor an incoming media feed providing up to the minute business or other type of stories. In a comparison with user preferences, timely stories or other news announcements may be provided to the user through the exchange.

With the trading of securities and other investment instruments/assets, it can also be important to effectively monitor corresponding amounts to be withheld for tax purposes. If the exchange knows a sellers starting basis, the system may accurately determine a corresponding taxable amount produced by the trade. Through monitoring when an instrument, investment, security and/or asset was acquired, its acquisition price, when it was traded and its trading value, the exchange may set aside the appropriate amount of money as tax withholdings, if necessary.

As noted above, there is can also be concerns over securities that carry fixed payments based on a pre-defined percentage rate of return at a regular time interval, typically referred to as a "coupon" payment. Another area is when the exchange price reflects an additional fee, such as when there is a regulatory or recognized standard settlement condition that allows for payments due to the current instrument holder. When the instrument is traded, there exists a certain amount of interest or excess fee that is owed to the seller. As the buyer will have possession of the instrument when payment is made, the exchange 124 must offset the trade amount by the owed interest.

The exchange 124 may facilitate a clean price where buyer and seller agree to specific terms. The exchange 124 can also embody the capability to make an accrued interest payment made from the buyer to the seller. Based on the factors such as the payment schedule of the security and guidelines relating to defined time terms (e.g. 30 days per month), the corresponding accrued interest can be calculated. Therefore, the exchange 124 may offset the purchase price of the security by the buyer by the accrued interest amount to reflect the eventual interest payment that the buyer will receive based on the buyer's ownership of the instrument, investment, security and/or asset.

Although the preceding text sets forth a detailed description of various embodiments, it should be understood that the legal scope of the invention is defined by the words of the claims set forth below. The detailed description is to be construed as exemplary only and does not describe every possible embodiment of the invention since describing every possible embodiment would be impractical, if not impossible. In view of the teachings of this specification, numerous alternative embodiments could be implemented, using either current technology or technology developed after the filing date of this patent, as may be readily apparent to those of ordinary skill in the art, which would still fall within the scope of the invention, and that the invention is not limited by specific embodiments described herein.

It should be understood that there exist implementations of other variations and modifications of the Invention and its various aspects, it is therefore contemplated to cover any and all modifications, variations or equivalents that are apparent in view of the disclosure hereof and fall within the scope of the basic underlying principals disclosed and claimed herein.

What is claimed is:

1. An electronic trading system comprising:
   an exchange processing device operative to:
      electronically display a plurality of fungible trading elements;
      process trading operations for a selected element of the trading elements; and
      electronically assess a risk factor for the trade operations;
   a back office processing device coupled to the exchange processing device, the back office processing device operative to electronically provide settlement operations related to the settlement of the trade operations of the exchange processing device; and
   a custodian processing device coupled to the back office, the custodian processing device operative to:
      electronically verify ownership of the selected trade element, including authenticating a dematerialization of the trading element, wherein dematerialization verifies proper ownership of the selected trade element; and
      electronically exchange ownership assignment of the trading element in response to a settlement command from the back office, if the risk factor is below a threshold value, performing the exchange in a straight through processing manner.

2. The electronic trading system of claim 1 further comprising: a gateway disposed between the exchange processing device office and operative to facilitate communication therebetween.

3. The electronic trading system of claim 1, the custodian further operative to:
   dematerialize, if needed, each of the fungible trading elements prior to inclusion with the plurality of fungible trading elements.

4. The electronic trading system of claim 1, wherein verifying ownership of the selected trade element includes using a Swift interface, the custodian operative to provide an validation command to the exchange processing device.

5. The electronic trading system of claim 1 wherein if the risk factor is above the threshold limit, electronically assigning the exchange to supervisory review prior to completion.

6. The electronic trading system of claim 1 further comprising: an investor interface coupled to the exchange processing device such that at least one investor may interact on the electronic trading system through the interface.

7. The electronic trading system of claim 1 wherein the trading element includes at least one of: instrument, investment, security and asset.

8. The electronic trading system of claim 1, wherein when the custodian exchanges ownership assignment, if the trading element including an accounting benefit, at least one of the custodian and back office is operative to offset a purchase price by a pro-rated return.

9. The electronic trading system of claim 1, further comprising:
the exchange processing device operative to electronically receive at least one buy offer relating to the selected element, the buy offer including an exchange asset; and
verify ownership of the exchange asset by a party submitting the buy offer.

10. A computerized method for electronic trading comprising:
electronically displaying a plurality of fungible trading elements;
electronically processing trading operations, via a first processing device, for a selected element of the trading elements;
electronically assess, via the first processing device, a risk factor for the trade operations;
electronically verifying ownership, via a second processing device, of the selected trade element, including authenticating a dematerialization of the trading element wherein dematerialization verifies proper ownership of the selected trade element; and
electronically exchanging ownership assignment, via the second processing device of the trading element in response to a settlement command from the back office, if the risk factor is below a threshold value, performing the exchange in a straight through processing manner.

11. The method of claim 10 further comprising:
dematerializing, if needed, each of the fungible trading elements prior to inclusion with the plurality of fungible trading elements.

12. The method of claim 10, wherein the step of verifying ownership of the selected trade element includes using a Swift interface and generating a validation command to verify ownership and continue the exchange of ownership assignment.

13. The method of claim 10 further comprising: prior to exchanging ownership assignments, electronically determining the risk factor associated with the exchange;
electronically comparing the risk factor to a predetermined threshold; and if the risk factor is above the threshold limit, electronically assigning the exchange to supervisory review prior to completion.

14. The method of claim 10 further comprising:
electronically receiving investor commands relating to the trading operations through an investor interface.

15. The method of claim 10 wherein the trading element includes at least one of: instrument, investment, security and asset.

16. The method of claim 10, wherein during the exchanging of ownership assignments, if the trading element includes an accounting benefit, the method further comprising offsetting a purchase price by a pro-rated return.

17. The method of claim 10, further comprising:
electronically receiving at least one buy offer relating to the selected element, the buy offer including an exchange asset; and
verifying ownership of the exchange asset by a party submitting the buy offer.

18. An electronic trading system comprising: a plurality of exchange processing devices operative to:
electronically display a plurality of fungible trading elements, including trading elements for sale and for purchase;
electronically process a trade command for facilitating trade operations between a buyer and a seller relating to a trading element; and
electronically assess a risk factor for the trade operations;
a gateway processing device in communication with the plurality of exchange processing devices, the gateway processing device operative to electronically receive a settlement command from one of the exchange processing devices, where the settlement command relates to settling a trade of the trade command between the buyer and the seller;
a back office processing device in communication with the gateway, the back office processing device operative to electronically provide settlement operations relating to the settlement command; and
a custodian processing device in communication with the back office, the custodian processing device operative to:
electronically verify ownership by the seller of the trading element, including authenticating a dematerialization of the trading element wherein dematerialization verifies proper ownership of the trading element; and
electronically exchange ownership assignment of the trading element from the seller to the buyer in response to a settlement command from the back office, and if the risk factor is below a threshold value, performing the exchange in a straight through processing manner.

19. The electronic trading system of claim 18, the custodian further operative to:
dematerialize, if needed, each of the fungible trading elements prior to inclusion with the plurality of fungible trading elements.

20. The electronic trading system of claim 18, wherein verifying ownership of the selected trade element includes using a Swift interface, the custodian operative to provide an validation command to the exchange processing device.

21. The electronic trading system of claim 18 further comprising:
an investor interface coupled to each of the plurality of exchange processing devices such that the buyer and seller may access and communicate with exchange processing devices through the interface.

22. The electronic trading system of claim 21, when the trade command relates to an offer to buy, further comprising:
the exchange processing device further operative to generate a verification request verifying the buyer has the financial asset to satisfy the buy offer;
the custodian operative to perform a verification operation relating to the buyer's financial asset; and
the exchange processing device authorizing the processing of the trade command upon verification by the custodian.

23. The electronic trading system of claim 18 wherein if the risk factor is above the threshold limit, electronically assigning the exchange to supervisory review prior to completion.

24. The electronic trading system of claim 18 wherein the trading element includes at least one of: instrument, investment, security and asset.

25. The electronic trading system of claim 18, wherein when the custodian exchanges ownership assignment, if the trading element including an accounting benefit, at least one of the custodian and back office is operative to offset a purchase price by a pro-rated return.

26. The electronic trading system of claim 18 wherein the custodian is disposed within the back office.

* * * * *